United States Patent [19]
Madabhushi

[11] Patent Number: 5,764,822
[45] Date of Patent: Jun. 9, 1998

[54] OPTICAL WAVEGUIDE DEVICE INCLUDING A BUFFER LAYER OF A THICKNESS INWARDLY DECREASING FROM EACH WAVEGUIDE EDGE

[75] Inventor: Rangaraj Madabhushi, Tokyo, Japan

[73] Assignee: NEC Corporation, Tokyo, Japan

[21] Appl. No.: 784,929

[22] Filed: Jan. 16, 1997

[30] Foreign Application Priority Data

Jan. 19, 1996 [JP] Japan ................ 8-007616

[51] Int. Cl.$^6$ ................ G02B 6/12
[52] U.S. Cl. ................ 385/14; 385/2; 385/3; 385/39; 385/40; 385/131; 385/132
[58] Field of Search ................ 385/1, 2, 3, 8, 385/9, 14, 15, 39, 40, 41, 43, 130, 131, 132

[56] References Cited

U.S. PATENT DOCUMENTS

| | | | |
|---|---|---|---|
| 4,035,058 | 7/1977 | Papuchon | 385/40 X |
| 4,775,208 | 10/1988 | Robinson et al. | 385/40 X |
| 4,944,838 | 7/1990 | Koch et al. | 385/131 X |
| 5,339,369 | 8/1994 | Hopfer et al. | 385/2 |
| 5,396,363 | 3/1995 | Valette | 385/131 X |
| 5,444,805 | 8/1995 | Mayer | 385/49 |
| 5,473,710 | 12/1995 | Jaw et al. | 385/14 |
| 5,473,711 | 12/1995 | Hakogi et al. | 385/14 |
| 5,479,552 | 12/1995 | Kitamura et al. | 385/132 |
| 5,502,780 | 3/1996 | Madabhushi | 385/3 |
| 5,598,490 | 1/1997 | Hakogi et al. | 385/14 |
| 5,661,830 | 8/1997 | Nishimoto | 385/40 |

FOREIGN PATENT DOCUMENTS

| | | | |
|---|---|---|---|
| 4-172316 | 6/1992 | Japan | 382/14 X |
| 4-190322 | 7/1992 | Japan | 385/14 X |
| 4-288531 | 10/1992 | Japan | 385/14 X |

OTHER PUBLICATIONS

M. Rangaraj, "A Wide–Band Ti:LiNbO$_3$ Optical Modulator with a Conventional Coplanar Waveguide Type Electrode", *IEEE Photonics Technology Letters*, vol. 4, No. 9, Sep. 1992, pp. 1020–1022.

*Primary Examiner*—Brian Healy
*Attorney, Agent, or Firm*—Sughrue, Mion, Zinn, Macpeak & Seas, PLLC

[57] ABSTRACT

In an optical waveguide device which is typically for use as a waveguide modulator or switch and comprises a substrate exhibiting an electrooptic effect, an input and an output waveguide, first and second phase shift waveguides, a dielectric buffer layer on the substrate and the input, the output, and the phase shift waveguides, and a signal electrode and a ground electrode on the buffer layer to overlie on the phase shift electrodes and which may further comprise an additional ground electrode to form a CPW structure rather than an ASL or an ACPS structure, the buffer layer has a thickness which decreases continuously or stepwise from an outer edge to an inner edge of each of the first and the second waveguides. Preferably, a ratio of a thin thickness at the inner edges to a predetermined thickness at the outer edges and outwardly thereof is between 0.25 to 0.9. Another ratio of a width of the signal electrode to a gap between the signal electrode and the ground electrode on the second waveguide is between 1 and 0.1.

19 Claims, 3 Drawing Sheets

OPTICAL WAVEGUIDE DEVICE INCLUDING A BUFFER LAYER OF A THICKNESS INWARDLY DECREASING FROM EACH WAVEGUIDE EDGE

BACKGROUND OF THE INVENTION

This invention relates to an optical waveguide device for use as an optical modulator or switch in various optical systems, such as high-speed optical communication, optical switching networks, optical information processing, and optical image processing.

Optical waveguide modulators and switches are some of most important key elements for realization of high-speed optical communication, optical switching networks, optical information processing, and optical image processing. These optical waveguides have been manufactured by a variety of fabrication methods in several interesting substrates. Researches on the optical waveguides have mainly been directed to lithium niobate (LiNbO$_3$) and semiconductor (typically gallium-arsenide (GaAs) based) substrates. In-diffusion of titanium (Ti) into lithium niobate substrates provides a convenient and relatively simple method of fabricating a low-loss strip waveguide in or along a principal surface of a substrate with excellent electrooptic properties.

Important parameters of a waveguide modulator are a driving voltage or drive power, a modulation bandwidth, and an insertion loss. Among the parameters, the driving voltage and the modulation bandwidth are in a trade-off relationship. The researches on optical waveguides have consequently been concentrated on optimizing the trade-off relationship.

The modulation bandwidth of a waveguide modulator depends mainly on electrode type, material, and geometry and a substrate dielectric constant. For broad-band applications, a travelling-wave electrode is widely used. The idea is to make the electrode appear as an extension of a driving transmission line. As such, the electrode should have a characteristic impedance which is equal to that of a cable and a source. In this case, a modulation speed is limited by a difference in transit time (or phase velocity or effective index) between an optical wave and an electric microwave. The travelling wave electrode has two types of structures, namely, an ASL (asymmetric strip line) or ACPS (asymmetric coplanar strip) electrode structure and a CPW (coplanar waveguide) electrode structure.

In the ASL, the ACPS, and the CPW electrode structures, the electrode comprises a signal electrode and a ground electrode (in the CPW electrode structure, first and second ground electrodes). It is known to use a dielectric buffer layer between such electrodes and the substrate including the waveguide as a waveguide member.

The modulation bandwidth of a waveguide modulator is limited by microwave attenuation and a velocity (characteristic impedance) mismatch between the optical wave and the microwave. It is possible to reduce the microwave attenuation and the velocity mismatch by optimizing parameters of the buffer layer and of the electrodes. Especially important is optimization of a width of the signal electrode and a gap between the signal electrode and the ground electrode or electrodes.

As mentioned before, the driving voltage is in a trade-off relation to the bandwidth. The driving voltage is related to an overlap factor between the microwave and the optical wave among other parameters. An overlap integral decreases with an increase of a layer thickness of the buffer layer. This buffer layer thickness increases the driving voltage.

Relationships between the overlap integral, the buffer layer thickness, and the driving voltage will now be discussed in greater detail.

In the optical waveguide modulator, the electrodes are placed over the waveguide member and are used to apply an electric field to the waveguide member by an applied voltage. Due to a linear electrooptic effect known as a Pockels effect, the waveguide member has a refractive index profile, which varies in proportion to the applied voltage. A change in this refractive index results in an electrooptically induced phase shift, which in turn results in modulation.

It is possible in general to write an electrooptically induced index change $\Delta n$ as a function of the applied voltage, V, as follows:

$$\Delta n(V) = n_e^3 r_{33} E(x, y)/2$$
$$= n_e^3 r_{33} V \Gamma/(2G),$$

where $n_e$ represents an extra-ordinary refractive index of a crystal used as the substrate, $r_{33}$ represents an electrooptic coefficient of the substrate crystal, E(x, y) represents a two-dimensional electric field applied through the electrodes, $\Gamma$ represents the overlap integral between the applied electric field and an optical mode field or, simply an optical field, and G represents the gap between the electrodes.

The overlap integral has a value between 0 and 1 depending on the gap, an optical mode profile of the waveguide member, a profile of the electric field, and the buffer layer thickness and is given by:

$$\Gamma = G \iint \Phi^2(x, y) E(x, y) dx dy / V \iint \Phi^2(x, y) dx dy, \quad (1)$$

where $\Phi$ (n, y) represents a two-dimensional optical field. Inasmuch as the applied electric field and the optical field have different mode profiles, the overlap integral denotes an amount of an overlap between these two mode profiles.

In order to reduce the applied voltage, it is necessary to increase the value of the overlap integral as nearly as possible to a theoretical limit of 1. In practice, a best achievable value is between 0.3 and 0.6, depending on the parameters, such as the buffer layer thickness, the electrode width, and the electrode gap.

The electrically induced phase shift has a unit value $\Delta\beta$ along an interaction length L of each electrode and the waveguide member. A total phase shift over the interaction length is therefore given by:

$$\Delta\beta L = 2\pi n_e^3 r_{33} V \Gamma/(\lambda G), \quad (2)$$

where $\lambda$ represents an optical wavelength of light projected to and guided through the waveguide member.

The waveguide switch is operable when the electrooptically induced phase shift is 0 and $\pi$ radians in an on state and in an off state. When the applied voltage is 0, no phase shift occurs to put the waveguide switch in the on state. When the applied voltage is equal to V($\pi$) volt, the phase shift becomes $\pi$ radians to put the waveguide switch in the off state. This applies to the waveguide modulator.

By substituting $\pi$ for the left-hand side of Equation (2), a product of the interaction length and a switching voltage V($\pi$), which is the applied voltage giving the phase shift of $\pi$ radians, is given by:

$$V(\pi)L = \lambda G/(2n_e^2 r_{33} \Gamma). \quad (3)$$

Equation (3) makes it possible to calculate the overlap integral and the switching voltage. More in detail, a refractive index profile of the waveguide member is first calculated. Subsequently, the optical field is calculated through calculation of an eigenmode. The applied electric field is also calculated. Now, the overlap integral and the product are calculated in accordance with Equations (1) and (3).

Comprising a thick CPW electrode structure, a conventional wide-band optical waveguide device operable with a low driving voltage is disclosed in a letter contributed by Madabhushi Rangaraj, the present applicant, and two others to the IEEE Photonics Technology Letters, Volume 4, No. 9 (September 1992), pages 1020 to 1022, under the title of "A Wide-Band Ti:LiNbO$_3$ Optical Modulator with a Conventional Coplanar Waveguide Type Electrode". It should be noted in this connection that a need is still present to reduce the driving voltage without narrowing the bandwidth. It is, however, difficult with the existing structure to satisfy the requirements for a low driving voltage and simultaneously for a broad bandwidth.

In the meanwhile, an optical waveguide device is revealed in Japanese Patent Prepublication (A) No. 172,316 of 1992 to be operable at a low driving voltage and with a broad bandwidth. According to this patent prepublication, the dielectric buffer layer is given a thick thickness at a portion remote from an interposed portion, if any, between each pair of the electrode and the waveguide member. It has, however, been confirmed by the present applicant that this structure is possible only when the electrode has a much broader width than the waveguide member. For typical example, the waveguide member has a width between 5 and 8 micrometers (as the width of a titanium strip before diffusion). The electrode has a width between 5 and 8 micrometers and a gap to an adjacent electrode between 15 and 28 micrometers. The buffer layer has a thickness between 1 and 2 micrometers. According to the patent prepublication, such values are arrived at so as to make a signal line has a characteristic impedance kept at 50 ohms for decreases in microwave attenuation and in velocity mismatch. It is consequently clear that the patent prepublication can not take care of problems described above because the electrode and the waveguide member have a common width. If the electrode is made to have a broad width than the waveguide member, a need appears to increase the gap correspondingly in order to keep the characteristic impedance at 50 ohms and to achieve the low microwave attenuation and the velocity matching because a ratio of the width to the gap limits above-mentioned factors.

A similar optical waveguide device is revealed in Japanese Patent Prepublication (A) No. 190,322 of 1992. This device is applicable when the electrode has a broader width than the waveguide member.

Still another optical waveguide device is disclosed in Japanese Patent Prepublication (A) No. 288,531 of 1992, when a ridge-type structure is given to the device by using a waveguide member of a directional coupler type and by physically etching the substrate on both sides of the waveguide member. The dielectric buffer layer has a thickness which is different on the waveguide member and at its outside. This device is not substantially different from the devices revealed in the patent prepublications referenced first and next.

Including the waveguide device previously proposed by the present applicant, prior art devices are of a structure wherein the electrode has a broader width than the waveguide member and wherein the dielectric buffer layer has a layer thickness which is uniform (including a zero thickness) between the electrode and the waveguide member. It is understood that the structure can not satisfy a conflicting requirement of the low driving voltage and the broad bandwidth.

SUMMARY OF THE INVENTION

It is consequently an object of the present invention to provide an optical waveguide device which comprises a substrate, a waveguide member along a surface of the substrate, a dielectric buffer layer on the substrate to cover the waveguide member, and a signal electrode on the waveguide member with the buffer layer interposed and in which the signal electrode and the waveguide member underneath have a common width to fulfil a conflicting requirement for a low driving voltage and a broad bandwidth.

It is another object of this invention to provide a waveguide device which is of the type described and which gives a sufficient phase shift to light guided through the waveguide member even when the low driving voltage is applied to the signal electrode.

It is still another object of this invention to provide a waveguide device which is of the type described and which can achieve, with suitable design and optimum parameters of the buffer layer and the electrode, reduction in microwave attenuation and velocity mismatch by keeping characteristic impedance at 50 ohms.

It is yet another object of this invention to provide a waveguide device which is of the type described and in which the dielectric buffer layer has a controlled thickness on the waveguide member, taking into consideration of nearly identical widths of the buffer layer and the electrode.

It is a different object of this invention to provide a waveguide device which is of the type described and in which a product of a driving voltage and an interaction length between the signal electrode and the waveguide member underneath is reduced with an increase in an overlap integral between an applied electric field and an optical mode field.

It is a further different object of this invention to provide a waveguide device which is of the type described and in which the signal electrode and at least one ground electrode have a structure of various types, such as a CPW (coplanar waveguide), an ASL (asymmetric strip line), and an ACPS (asymmetric coplanar strip) electrode structure.

Other objects of this invention will become clear as the description proceeds.

In accordance with this invention, there is provided a waveguide device comprising (a) a substrate exhibiting an electrooptic effect and having a principal surface, (b) a waveguide member along the principal surface to comprise an input waveguide, an output waveguide, and first and second waveguides between the input and the output waveguides, (c) a dielectric buffer layer on the principal surface to cover the waveguide member, (d) a signal electrode on the buffer layer to substantially overlie the first waveguide, and (e) a ground electrode on the buffer layer to overlie the second waveguide, wherein the buffer layer has a layer thickness which decreases from one edge to the other edge of both edges of each of the first and the second waveguides.

It is preferred in this respect that the layer thickness is thicker on outer edges of the first and the second waveguides than on their inner edges.

With this change in the layer thicknesses, an overlap integral increases between electric (microwave) and optical waves to reduce the driving voltage.

DESCRIPTION OF THE PREFERRED EMBODIMENTS

Figure 1:
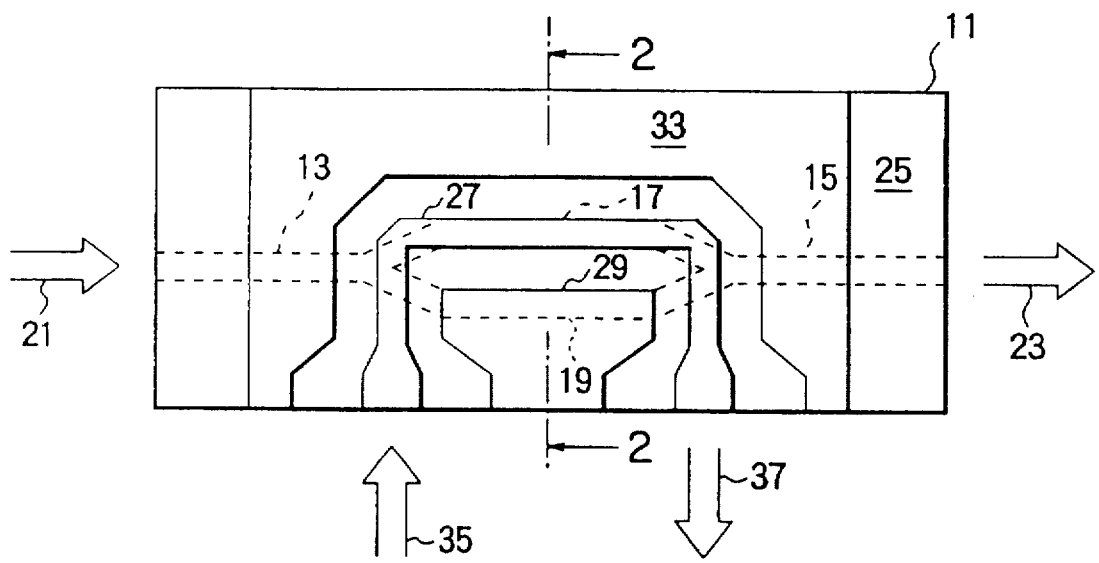
FIG. 1 schematically shows a top view of a general waveguide device.

Referring to FIG. 1, a top view is not different between a conventional waveguide device and each of waveguide devices according to some of preferred embodiments of the present invention. In FIG. 1, a line A–B is for a cross section depicted in any one of FIGS. 2 to 4.

Figure 2:
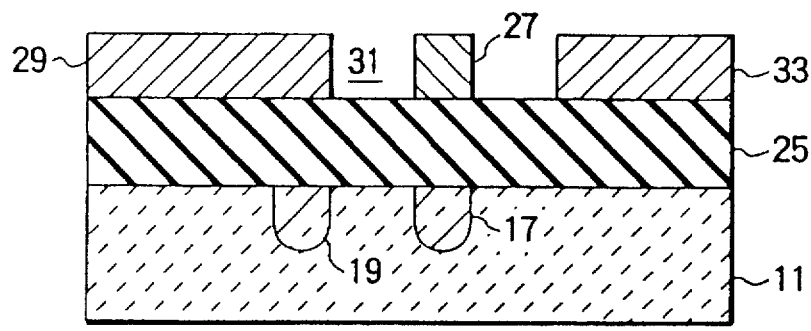
FIG. 2 shows on an enlarged scale a schematic cross section taken on line A–B of FIG. 1 as regards the waveguide device which is a conventional one in this case.

Referring to FIG. 2 in addition to FIG. 1, the description will start at the conventional waveguide device in order merely to facilitate an understanding of the present invention. The waveguide device comprises a substrate 11 which is capable of exhibiting an electrooptic effect and has a principal surface and which is typically a z-cut crystal of lithium niobate $LiNbO_3$ and has a y axis horizontally in FIG. 1.

On the principal surface, a waveguide member or path is manufactured as follows in a predetermined configuration which will presently become clear. A strip of titanium Ti of a strip width between 5 and 20 micrometers and a strip thickness between 500 and 1200 angstroms was laid on the principal surface in the predetermined configuration and was heated at a temperature between 900° and 1100° C. for 5 to 12 hours to in-diffuse titanium into the substrate to turn titanium niobate into titanium diffused lithium niobate Ti:LiNbO$_3$ and to form the waveguide member which had a member or path width of substantially the strip width and a diffusion depth between 3 and 10 micrometers and comprised in an illustrated shape an input waveguide 13, an output waveguide 15, and a parallel pair of a first waveguide 17 and a second waveguide 19 connected to the input and the output waveguides 13 and 15 by Y-shaped branch waveguides. In operation, an optical beam is projected to the input waveguide 13 as indicated by an arrow 21, branched to the first and the second waveguides 17 and 19, and combined for lead out through the output waveguide 15 in the manner indicated by another arrow 23.

Furthermore, an electric signal is applied in the manner which will shortly be described. The electric signal develops a phase difference between the optical beam guided through the first and the second waveguides 17 and 19, which are therefore referred to alternatively as a pair of phase shift waveguides (17, 19) having a pair of outer edges and a pair of inner edges with the outer and the inner edges extending contiguous to a major part that does not transmit in the substrate 11 the optical beam.

Including the waveguide member, the substrate 11 is covered by a dielectric buffer layer 25 which is typically a silicon dioxide layer of a layer thickness t(0) between 0.3 and 10 micrometers and which has a dielectric constant between 1.1 and 40. Alternatively, the buffer layer is an aluminium oxide ($Al_2O_3$) layer, a barium fluoride ($BaF_2$) layer, or a magnesium fluoride ($MgF_2$) layer.

On the buffer layer 25, electrodes were formed as by electroplating of gold, to comprise a signal electrode 27 having an electrode thickness between 3 and 40 micrometers, an interaction length L of a length value between 7 and 10 mm for interaction relative to the first waveguide 17, and an electrode width W between 5 and 20 micrometers. In the electrodes, a first ground electrode 29 has the electrode thickness, another interaction length of the length value for interaction relative to the second waveguide 19, and another broader electrode width between 100 and 9000 micrometers. The signal electrode 27 and the first ground electrode 29 are spaced apart by an electrode gap 31 of a gap width G between 5 and 200 micrometers so that a "width-to-gap" ratio of the electrode width to the gap width W/G is between 1 and 0.1. A second ground electrode 33 is on a different side of the signal electrode 27 in connection with the first ground electrode 29 so that the electrodes 27, 29, and 33 have a CPW (coplanar waveguide) electrode structure.

On using the waveguide device either as a waveguide modulator or as a waveguide switch, a driving voltage V of microwave is applied to the signal electrode 27 relative to ground with the first and the second ground electrodes 27 and 33 grounded. Feed from and return to a microwave source (not shown) are indicated by arrows 35 and 37. In the conventional waveguide device, it is impossible to satisfy a conflicting requirement for a low driving voltage and a broad bandwidth of operation.

Figure 3:
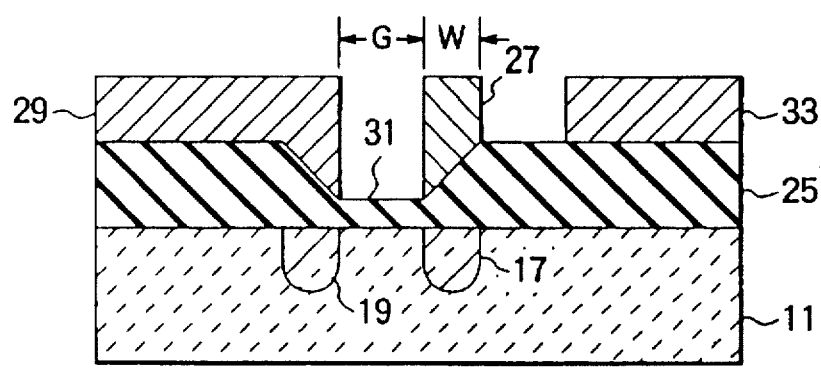
FIG. 3 shows on an enlarged scale a schematic cross section taken on the line A–B as regards a waveguide device according to a first embodiment of the instant invention.

Turning to FIG. 3 with FIG. 1 continuously referred to, the description will proceed to a waveguide device according to a first preferred embodiment of this invention. The waveguide device comprises similar parts designated by like reference numerals throughout the following and is manufactured in the manner described in conjunction with FIGS. 1 and 2. Actual dimensions are as exemplified in the foregoing.

In FIG. 2, the dielectric buffer layer 25 has a thin thickness t(1) at lines where the signal electrode 27 and the first ground electrode 29 have opposing surfaces which define the electrode gap 31. More particularly, the buffer layer 25 has sloping surfaces on the first and the second waveguides 17 and 19. The thin thickness is decided so that a thickness ratio (T(1)/T(0)) of the layer thickness to the thin thickness lies between 0.25 and 0.9 depending on a desired value of the driving voltage V and other microwave design parameters.

It is possible so to form the buffer layer 25 as by etching after a precursory layer is formed with a uniform thickness as in the conventional microwave device. The etching may be wet chemical etching typically by buffered fluoric acid. Alternatively, it is possible to etch the buffer layer by electron cyclotron resonance (ECR) or by a reactive ion beam (RIB) although minute optimization of etching conditions is necessary when the buffer layer is the silicon dioxide layer.

Figure 4:
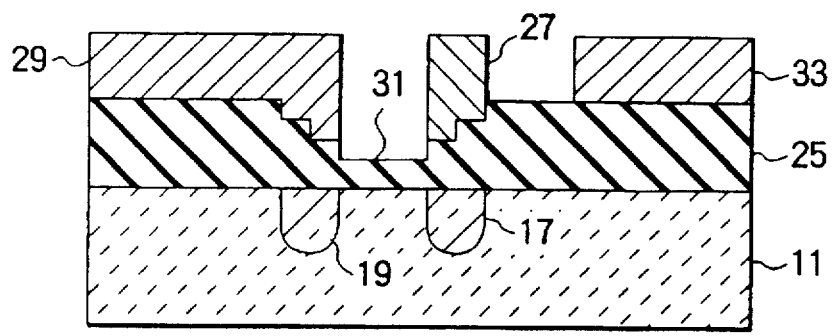
FIG. 4 shows on an enlarged scale a schematic cross section taken on the line A–B as regards a waveguide device according to a second embodiment of this invention.

Further turning to FIG. 4 with FIG. 1 continuously referred to, attention will be directed to a waveguide device according to a second preferred embodiment of this invention. Actual dimensions of parts are not different from those described with reference to FIGS. 1 and 2, including the thickness ratio.

In FIG. 4, the dielectric buffer layer 25 has a thickness decreasing stepwise from the layer thickness to the thin thickness on the first and the second waveguides 17 and 19.

Figure 5:
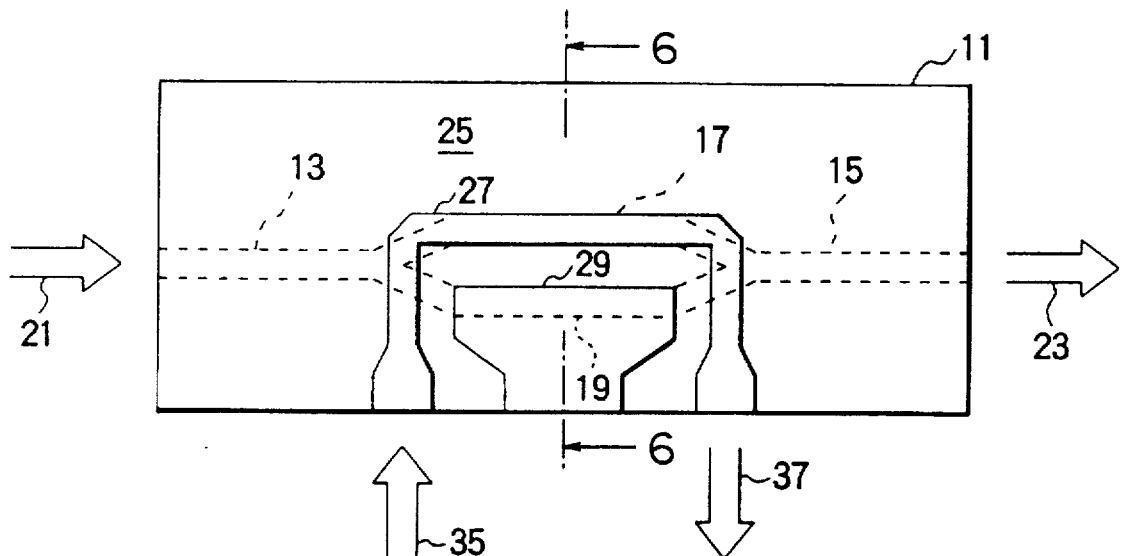
FIG. 5 schematically shows a top view of another general waveguide device.

Referring now to FIG. 5, an ASL (asymmetric strip line) or an ACPS (asymmetric coplanar strip) electrode structure is used rather than the CPW electrode structure in waveguide device according to some others of preferred embodiments of this invention. These waveguide devices are similar in other respects to those illustrated with reference to FIG. 1 in combination with FIGS. 3 and 4. Inasmuch as the waveguide device comprises only one ground electrode, the first ground electrode 27 will be referred to simply as a ground electrode 27.

Figure 6:
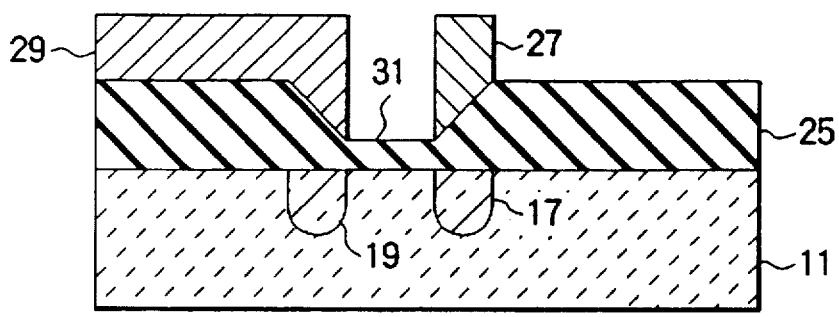
FIG. 6 shows on an enlarged scale a schematic cross section taken on a line C–D of FIG. 5 as regards a waveguide device according to a third embodiment of this invention.

Referring to FIG. 6 with FIG. 5 additionally referred to, attention will be directed to a waveguide device according to a third preferred embodiment of this invention. Referring more particularly to FIG. 6, the dielectric buffer layer 25 is similar to that described in conjunction with FIG. 3.

Figure 7:
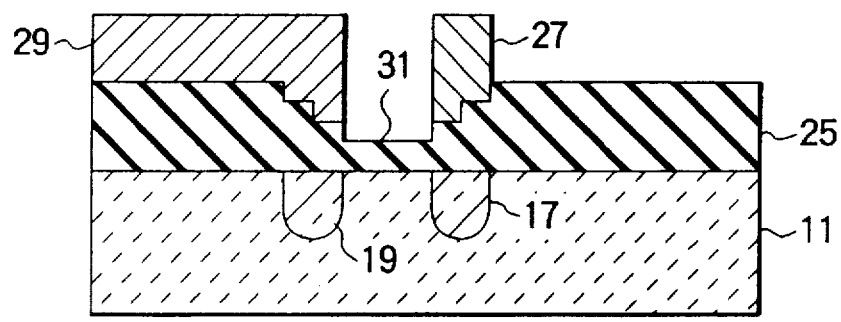
FIG. 7 shows an enlarged scale a schematic cross section taken on the line C–D as regards a waveguide device according to a fourth embodiment of this invention.

Turning to FIG. 7 with FIG. 5 continuously referred to, the description will proceed to a waveguide device according to a fourth preferred embodiment of this invention. In FIG. 7, the dielectric buffer layer 25 is not different from that described in connection with FIG. 4.

Figure 8:
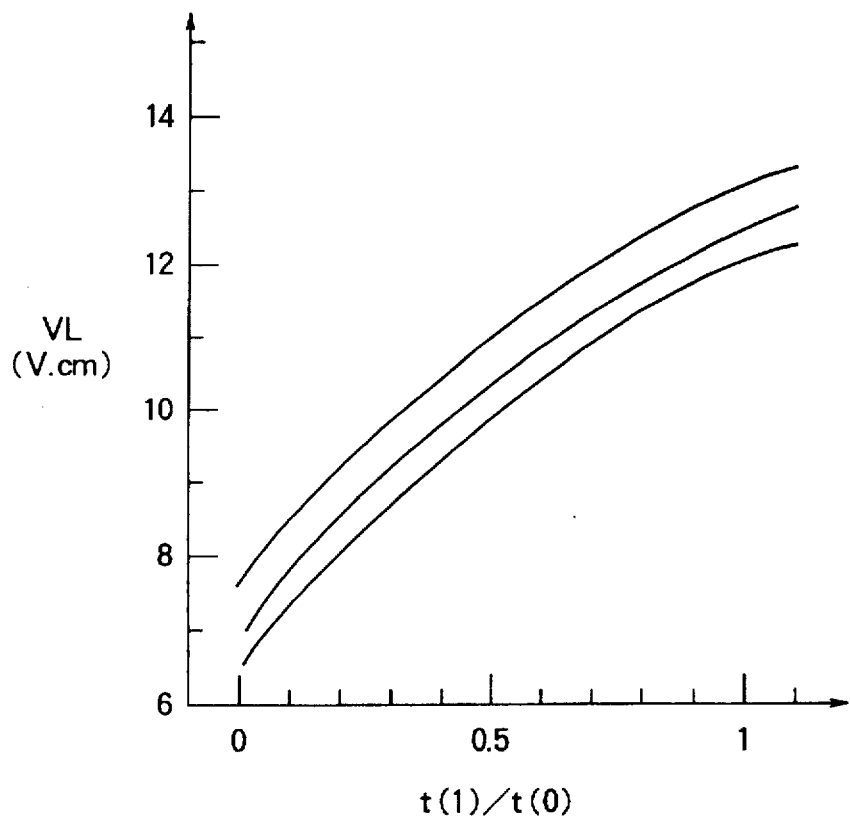
FIG. 8 exemplifies relationships between a thickness of a dielectric buffer layer of a waveguide device according to this invention and a product of a driving voltage of the waveguide device and an interaction length of each electrode and a waveguide member underneath in the conventional waveguide device and in the waveguide devices of this invention.

Referring afresh to FIG. 8 with FIGS. 1 to 7 referred to in addition, the conventional waveguide device and examples of the waveguide devices of this invention will be reviewed as regards a product VL, described hereinabove, of the driving voltage and the length of interaction between the signal electrode 27 and the underlying one of the parallel parts of waveguide member, namely, the first waveguide 17, with a layer thickness t(0) set at 1 micrometer. In FIG. 8, the abscissa shows the thickness ratio t(1)/t(0) of the thin thickness of the dielectric layer 25 to its layer thickness, where the thickness ratio is equal to 1 for the conventional microwave device exemplified with reference to FIGS. 1 and 2. The ordinate shows the product in volt-centimeter. The product was calculated for FIG. 8 by using Equations (1) and (3) described heretobefore and by selecting 1 micrometer as the layer thickness t(0).

In the manner described in the foregoing, a value is selected for the thickness ratio t(1)/t(0) between 0.25 and 0.9 in the waveguide devices exemplified in conjunction with FIG. 1 and FIGS. 3 to 7. This value is selected in consideration of a preferred value of the driving voltage V and other microwave design parameters. Among these parameters, several ratios are selected for the width-to-gap ratio W/G of the electrode width of the signal electrode 27 to the gap between the signal electrode 27 and the first ground electrode 29. Such ratios are 7/28, 7/21, and 7/15 for curves illustrated in FIG. 8 uppermost, middle, and lowermost, respectively.

When the thickness ratio is equal to 1.0 or greater, it is impossible to attain the reduced driving voltage. When the thickness ratio is between 0.1 and 1.0, it has been confirmed possible to reduce the driving voltage although the product VL may vary.

In the manner exemplified in FIG. 8, it is possible in accordance with this invention to get a smaller voltage-interaction length product VL. In other words, this invention makes it possible to reduce the applied driving voltage V, for example, to 5 volts, when the interaction length is selected. Moreover, it is possible to increase the overlap integral Γ of the electric field and the optical mode field and thereby to broaden an optical bandwidth to 23 GHz or wider, keeping the characteristic impedance at 50 ohms. Inasmuch as the dielectric layer 25 has a thickness which gradually varies beneath each of the first and the second waveguides 17 and 19 either continuously or stepwise without an abrupt change, it is possible to reduce the microwave attenuation and an insertion loss of the waveguide device as the waveguide modulator or switch to 4 dB. Suitable selection of the dimensions of each of the electrodes 27 and 29 and, if any, the second ground electrode 31 makes it possible to reduce the velocity mismatch between the optical wave and the microwave and thereby to achieve a broad bandwidth.

While this invention has thus far been described in specific conjunction with several preferred embodiments thereof, it will now be readily possible for one skilled in the art to put this invention into practice in various manners. For example, it is possible to provide the buffer layer 25 with a thickness which smoothly varies, cross-wise of each of the first and the second waveguides 17 and 19 or each of the signal electrode 27 and the first ground electrode 29, from the layer thickness t(0) to the thin thickness t(1). The layer thickness should preferably be the predetermined thickness along outer edges of the first and the second waveguides 17 and 19 and be the thin thickness along their inner edges. When the layer thickness is stepwise varied, it is preferred that the layer thickness is, along the outer edges, a thick thickness which is thinner than the predetermined thickness. In either event of smooth and stepwise decrease, the layer thickness is preferably varied lengthwise along branches of the Y branch waveguides. It is possible to use as the substrate 11 a solid member of other electrooptic effect exhibiting material, such as a gallium arsenide semiconductor material.

What is claimed is:

1. An optical waveguide device comprising a substrate exhibiting an electrooptic effect and having a principal surface, a waveguide member along said principal surface to comprise an input waveguide, an output waveguide, and first and second waveguides between said input and said output waveguides, a dielectric buffer layer on said principal surface to cover said waveguide member, a signal electrode on said buffer layer to substantially overlie said first waveguide, and a ground electrode on said buffer layer to overlie said second waveguide, wherein said buffer layer has a layer thickness which decreases from one edge to the other edge of both edges of each of said first and said second waveguides.

2. An optical waveguide device as claimed in claim 1, wherein said first and said second waveguides are for use as a pair of phase shift waveguides.

3. An optical waveguide device as claimed in claim 2, wherein the one edge of said first waveguide and the one edge of said second waveguide are remote from each other than the other edge of said first waveguide and the other edge of said second waveguide.

4. An optical waveguide device as claimed in claim 3, wherein said layer thickness continuously decreases from a predetermined thickness at the one edge of each of said first and said second waveguides to a thin thickness at the other edge of each of said first and said second waveguide, said predetermined thickness being had by said layer thickness away from the other edge of said first waveguide and from the one edge of said second waveguide.

5. An optical waveguide device as claimed in claim 4, wherein a thickness ratio of said thin thickness to said predetermined thickness is selected between 0.25 and 0.9.

6. An optical waveguide device as claimed in claim 4, wherein said signal electrode has over said first waveguide an electrode width which is equal to a distance between the both edges of said first waveguide.

7. An optical waveguide device as claimed in claim 1, wherein said signal and said ground electrodes have opposing side surfaces which are spaced apart by an electrode gap of a width-to-gap ratio of said electrode width to said electrode gap with said width-to-gap ratio selected between 1 and 0.1.

8. An optical waveguide device as claimed in claim 6, said ground electrode being a first ground electrode, wherein said waveguide member further comprises a second ground electrode on an opposite side of said first ground electrode relative to said signal electrode.

9. An optical waveguide device as claimed in claim 8, wherein said width-to-gap ratio is the ratio of said electrode width to the electrode gap between the opposing side surfaces of said signal electrode and said first ground electrode and has a value selected between 1 and 0.1.

10. An optical waveguide device as claimed in claim 6, wherein said substrate is made of lithium niobate, said waveguide member being formed, before deposition of said buffer layer on said principal surface, by thermal diffusion of titanium from said principal surface into said substrate.

11. An optical waveguide device as claimed in claim 10, wherein said buffer layer is made of a dielectric material having a dielectric constant between 1.1 and 40.

12. An optical waveguide device as claimed in claim 3, wherein-said layer thickness stepwise decreases from a thick thickness at the one edge of each of said first and said second waveguides to a thin thickness at the other edge of each of said first and said second waveguides, said thick thickness being not thicker than a predetermined thickness had by said layer thickness away from the other edge of said first waveguide and from the one edge of said second waveguide.

13. An optical waveguide device as claimed in claim 12, wherein a thickness ratio of said thin thickness to said predetermined thickness is selected between 0.25 and 0.9.

14. An optical waveguide device as claimed in claim 12, wherein said signal electrode has over said first electrode an electrode width which is equal to a distance between the both edges of said first electrode.

15. An optical waveguide device as claimed in claim 14, wherein said signal and said ground electrodes have opposing side surfaces which are spaced apart by an electrode gap of a width-to-gap ratio of said electrode width to said electrode gap with said width-to-gap ratio selected between 1 and 0.1.

16. An optical waveguide device as claimed in claim 14, said ground electrode being a first ground electrode, wherein said waveguide member further comprises a second ground electrode on an opposite side of said first ground electrode relative to said signal electrode.

17. An optical waveguide device as claimed in claim 16, wherein said width-to-gap ratio is the ratio of said electrode width to the electrode gap between the opposing side surfaces of said signal electrode and said first ground electrode and has a value selected between 1 and 0.1.

18. An optical waveguide device as claimed in claim 14, wherein said substrate is made of lithium niobate, said waveguide member being formed, before deposition of said buffer layer on said principal surface, by thermal diffusion of titanium from said principal surface into said substrate.

19. An optical waveguide device as claimed in claim 18, wherein said buffer layer is made of a dielectric material having a dielectric constant between 1.1 and 40.

* * * * *